United States Patent [19]

Chen

[11] Patent Number: 4,561,417
[45] Date of Patent: Dec. 31, 1985

[54] BARBECUE OVEN

[76] Inventor: Ming-Tang Chen, No. 14, Alley 89, La. 59, Nan Men Rd., Taichung, Taiwan

[21] Appl. No.: 647,448

[22] Filed: Sep. 5, 1984

[51] Int. Cl.⁴ .............................................. A47J 37/00
[52] U.S. Cl. .................................. 126/25 A; 126/9 R
[58] Field of Search ............. 126/25 R, 25 A, 25 AA, 126/9 R, 9 B, 9 A, 1 R, 41 R, 41 A, 39 R, 14; 99/448, 449, 450, 474, 416

[56] References Cited

U.S. PATENT DOCUMENTS 2,920,177  1/1960  Brane ................................ 126/41 A
3,393,670  7/1968  Psarris .............................. 126/25 R Primary Examiner—William E. Lyddane
Assistant Examiner—Gerald A. Anderson
Attorney, Agent, or Firm—Holman & Stern

[57] ABSTRACT

A barbecue grill has several dish-shaped racks which can be optionally assembled and disassembled, and supported to rotate and control the degree of heat applied to the meat and prevent burning it, part of the racks being far away from the fire for holding meat or other food for slow cooking, warming, or cooling. The bottom of the grill has a plate for holding charcoal and holes in the plate for dropping charcoal or ash, to an ash collecting drawer. At two sides of the body, are side plates which incline outward. If ash is full in the ash receiver drawer, it can be drawn and poured out. Support legs insert into the grill body to support the body in use, and can be inverted to form a portable handle, so that, after used, the dish-shaped racks can be disassembled and stored in the body, and the side plates are folded to cover the body, and the support legs are inverted to become a handle making the grill very convenient to be carried.

3 Claims, 5 Drawing Figures

BARBECUE OVEN

BACKGROUND OF THE INVENTION

1. Field of the Invention

The present invention relates to a new type of barbecue grill, especially a grill asembly having dish-shaped grills which can be optionally assembled to the body to rotate to let barbecued meat be heated uniformly, and when not used, the grills can be disassembled and placed in the grill body, and then covered by side plates of the body. The support legs can be inverted to become a handle making the grill, which is very light, portable and convenient to be carried.

2. Description of the Prior Art

At present, outdoor activities are very popular. Whether picnicking or camping, a barbecue is held outdoors not only to enjoy food, but also for entertainment and to communicate with others and therefore, it is a meaningful activity. However there are many defects in barbecue ovens. There are only two cooking grills above the fire to be turned repeatedly, and therefore the barbecued meat will be burned and charcoal scraps or ash will stick on the meat, which is not good for health. The references discussed below are granted patents of barbecue ovens.

U.S. Pat. No. 3,526,217, entitled POST MOUNTED COOKING UNIT, relates to a support rod which is inserted into the earth. On the support rod, there is a movable barbecue net or grill and a movable oven body. The oven body and grills are raised and lowered to control the heating condition, but the entire grill is still placed at the upper part of the fire source, and it is easy to let the meat be burned which is barbecued continuously. Since there is only one grill it cannot simultaneously barbecue two different kinds of food which must be barbecued at different temperatures, and the bottom of the support rod is designed in a sharp shape so that it is easy to hurt people or harm objects, and it is inconvenient to be carried.

U.S. Pat. No. 3,040,651, entitled CHARCOAL GRILL, is a design with an isolated mask for the flame in the oven body. On the upper part of the oven body, there is placed a fixed barbecue grill. Although the isolated mask can be used to prevent barbecued meat from being touched by the flame directly and being burned immediately, due to the grill being fixed and not extending outside the fire source, it will let the meat be burned, which still is not an ideal design.

U.S. Pat. No. 3,217,634, entitled MULTI-FUNCTION FOR TABLE COOKING APPARATUS, shows a movable barbecue grill in the oven, but the grill cannot rotate and has the same defect as the POST MOUNTED COOKING UNIT, and it uses a push rod and wheel to push the oven body, and therefore is very inconvenient to move around. Due to all the equipment needed for a picnic or for camping, it should be light and convenient for carrying.

BRIEF SUMMARY OF THE INVENTION

The purpose of the present invention is to solve the above defects and the defects of the above patents, and provide a new type of barbecue grill having several movable dish-shaped grills which can be optionally assembled and disassembled on the grill body and can be mounted to rotate. Also the support rods under the grills can be used to adjust the distance between the fire and the grills so that the meat can be easily barbecued to the degree desired and will not be burned, and different foods can be barbecued simultaneously.

Another purpose of the present invention is to provide a dish-shaped barbecue grill that can be easily disassembled to be stored in the grill body and covered by side plates, and the support legs may be inverted to make a handle for the portable barbecue grill having a small volume and light weight convenient to be carried.

My new type of barbecue grill mainly consists of a grill body, dish-shaped grills, and support rack on the grill body wherein several dish-shaped grills can be optionally assembled and disassembled, and linked to rotate to let the barbecued meat be heated uniformly, and not be burned. The support legs can support the grill body at the bottom. There is a plate for holding charcoal, and a filter hole in the plate for removing ash in order to clean charcoal scraps. After use, the grills can be disassembled and placed in the grill body, and then covered by side plates on the body. Legs are then inverted to become a portable carrier. Its volume is small and its weight is litht, and therefore it is easily available to be carried for barbecue outdoors or in the garden.

BRIEF DESCRIPTION OF THE DRAWINGS

Other purposes, structure and function of the present invention will now be described in detail with reference to the accompanying drawings wherein:

FIG. 5 is a reduced perspective view showing the bottom side of the grill.

DETAILED DESCRIPTION

Figure 1:
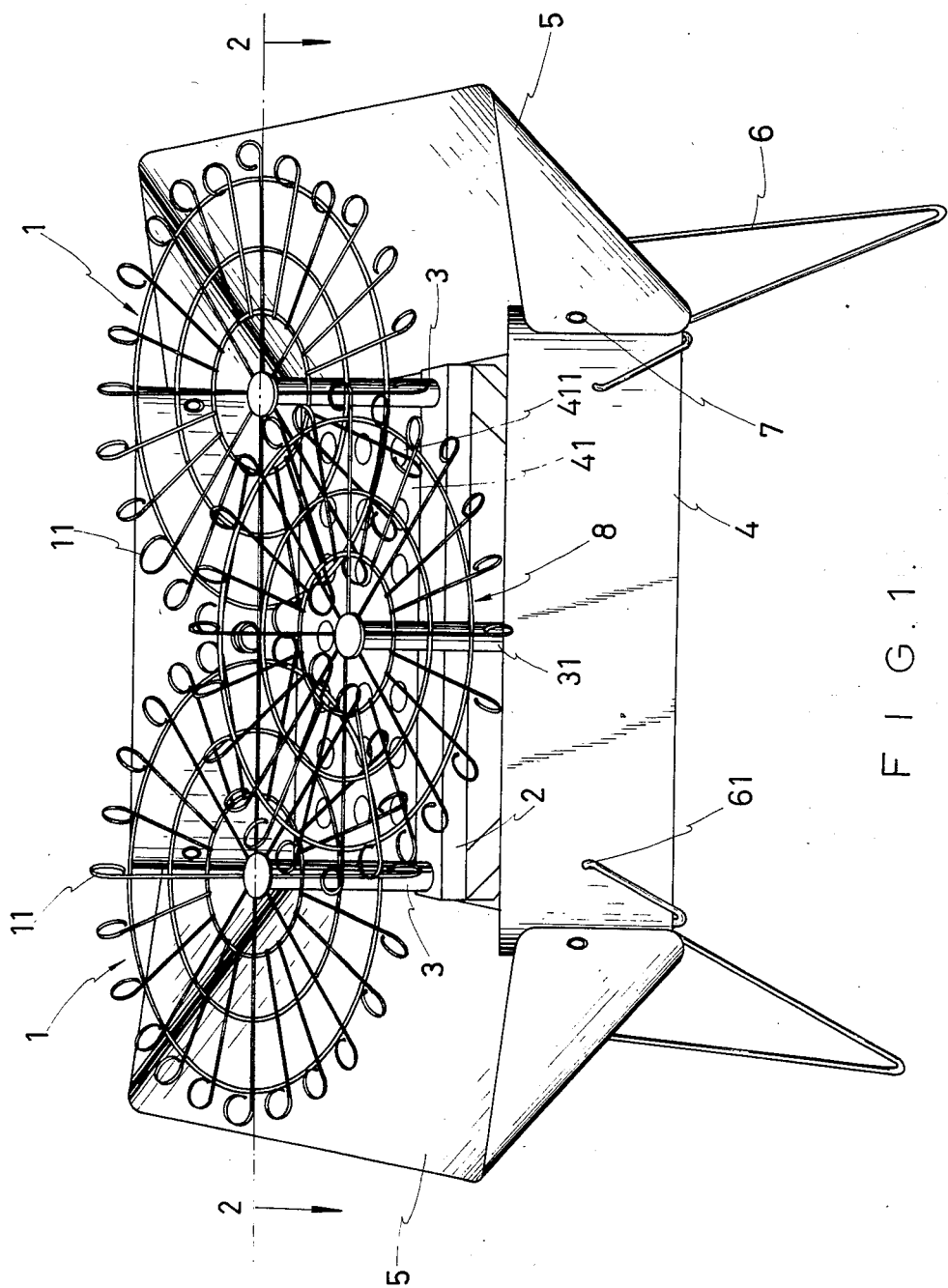
FIG. 1 is a perspective view of the barbecue grill of the present invention.
Figure 2:
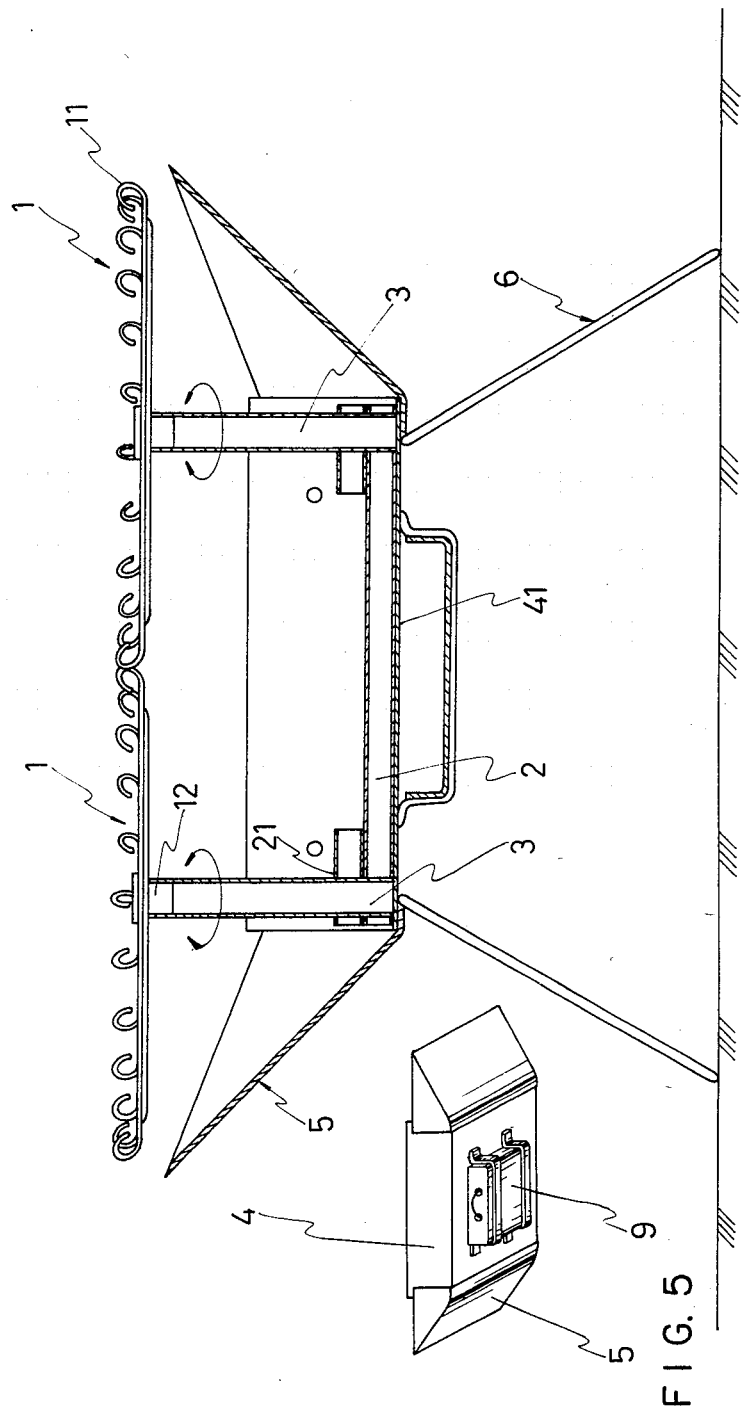
FIG. 2 is a cross-sectional view taken along line 2—2 of FIG. 1.
Figure 3:
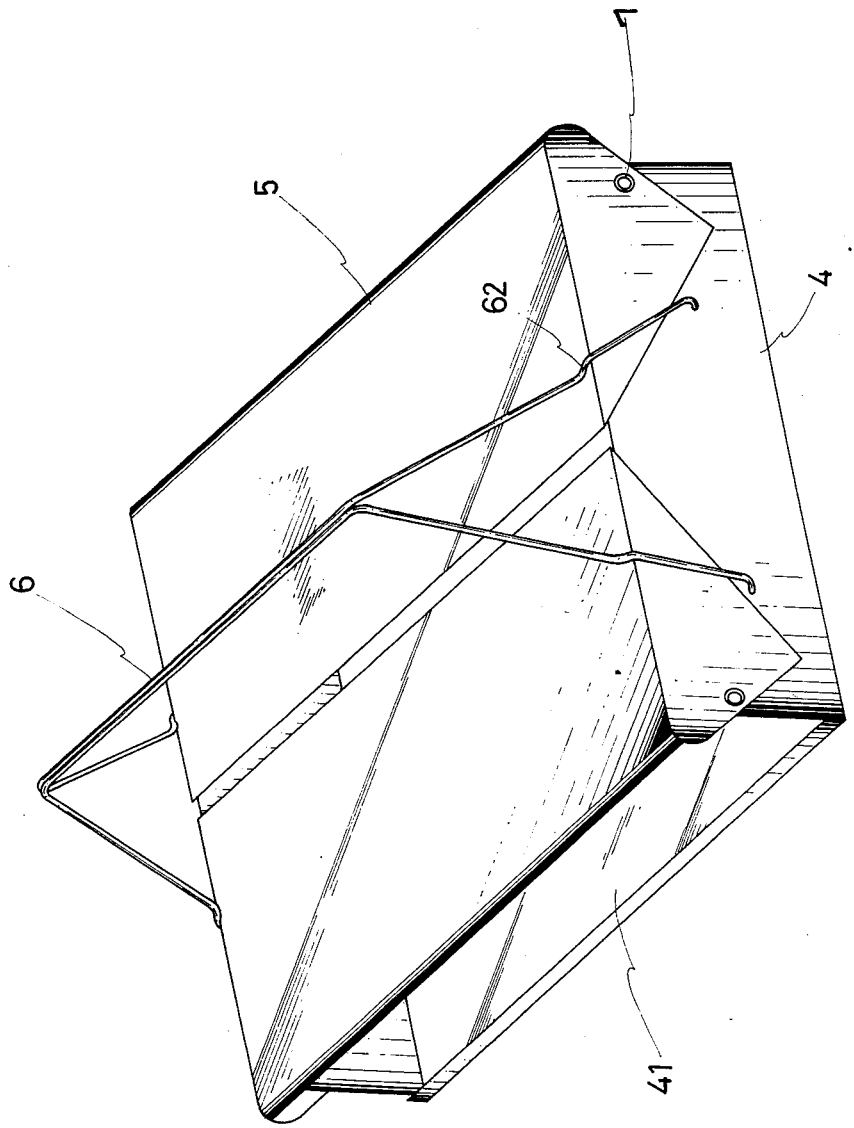
FIG. 3 is a perspective view of the present invention when not in use.

As shown in the above drawings, the present invention is mainly combined of dish-shaped racks 1, 8, supporting seat 2, supporting rods 3, 31, grill body 4, side plates of the grill body 5, and body support legs 6. Dish-shaped grilling nets or racks 1, 8 include strips extending from the center radially outwardly, and the radial outer end 11 is bent upward so that each rack has a space for food to be barbecued. On the lower side at the center of each rack there is a round pole 12 to connect with support rods 3, 31, which are insertable into the seating holes 21 in support seat 2, the position of holes 21 being designed on the principle that the curled part 11 on the racks cannot touch each other and part of rack 1 extends outside the fire source, and another rack 8 can place the barbecued meat or other food to be barbecued farther above the fire.

Support seat 2 is substantially triangular, and is fixed on the plate 41 of the grill body which is used to hold charcoal and is provided with filter holes 411 through which ash of the burned charcoal drops into ash container 9 on the lower part of grill body 4. Container 9 is a drawer type dish member which is used to store ash and pour it out. Two side plates 5 are pivotally connected by rivets 7 at two sides of the grill body, and inclined outwardly to constitute a boat shape with the grill body. The support legs 6 are made of good springy material, and each has two bent parts. The upper bent part 61 inserts into grill body 4 through holes provided therefor to connect the support rack to the body, and the lower bent part 62 turns upward and tightly engages against two sides of the body 4, when it is turned downward and also the bottom of the oven body 4 to support the grill on the ground, or a table, for example.

When the barbecue grill is used, it is only necessary to turn the racks 1, and it can carry another rotatable rack so that the barbecued meat on the racks can be heated uniformly. The meat can be rotated outside the fire and it will not be burned, when the fire is burning continuously. Another rack 8 can hold other foods which must be far away from fire and can be barbecued simultaneously, and can hold the cooked meat to be cooled for eating.

When the barbecue grill is not in use, dish-shaped racks 1 and 8 and support rods 3, 31 are respectively removed and placed in the grill body 4, side plates 5 are raised up to cover the top of the body 4, and support legs 6 are turned upward from two sides to become a handle for the portable grill, whereby it is very convenient to be carried.

Figure 4:
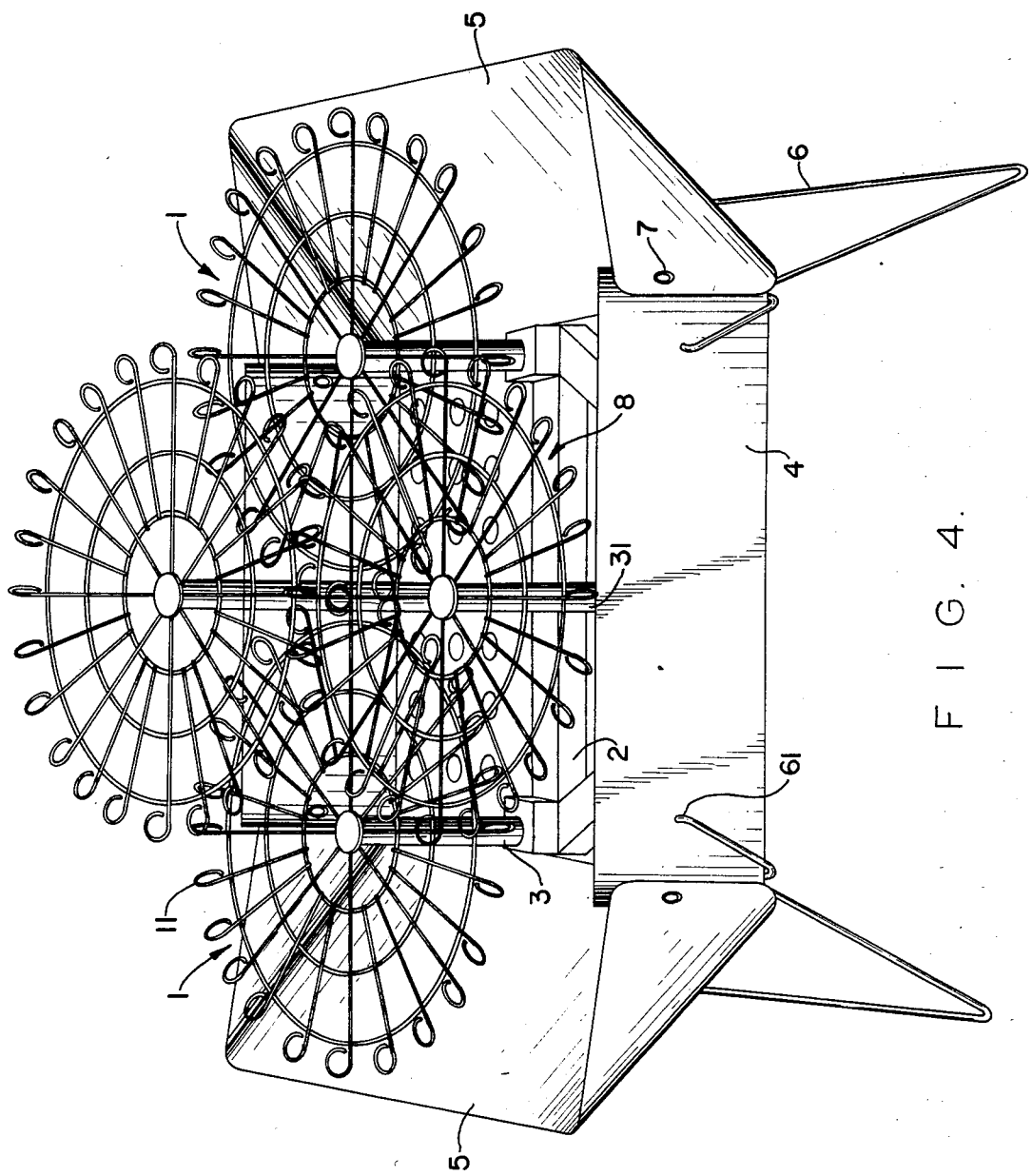
FIG. 4 is a view similar to FIG. 1 showing a different combination of grills.

The above description is of only one of the embodiments of the present invention, and is not intended to limit the present invention. Many modifications of the embodiments of the present invention may fall within the scope of the invention, e.g. the number of racks may be increased as shown in FIG. 4.

I claim:
1. A barbecue grill comprising:
  a grill body having four sides and a planar bottom for holding charcoal;
  a plurality of ash dispensing holes in said bottom;
  a support seat on said bottom;
  a plurality of seating holes in said support seat;
  upwardly extending support rods removably insertable into said seating holes at their lower ends;
  a plurality of dish-shaped cooking racks, each comprising a plurality of spaced strips extending substantially radially outwardly from a central portion of the rack with the outer ends of said strips bent upwardly, and a connection on the lower side at said central portion for removably connecting said rack to the upper end of one of said support rods;
  pivotal side plates pivotally attached to two opposite sides of said grill body and having a configuration so that when in position for use said side plates are inclined upwardly and outwardly with respect to said bottom, and said side plates can be pivoted to substantially cover the top of said grill body;
  support leg receiving holes in the sides of said grill body other than said pivotal side plates; and
  support legs for supporting said grill body above a surface each comprising, a flexible rod-like element having a central portion for engaging a surface, upwardly extending portions extending from the ends of said central portion, inwardly turned portions on the upper ends of said upwardly extending portions insertable into said support leg receiving holes, and intermediate bent portions between said upper ends and said central portion engageable under at least part of said bottom, said legs being pivotable in said support leg receiving holes so that when said side plates are in the covering position, said legs can be pivoted to extend upwardly over said side plates to form a handle for carrying said grill.

2. A barbecue grill as claimed in claim 1 wherein:
said bottom comprises a U-shaped member having the legs thereof extending upwardly forming sides of the grill body;
each pivotal side plate has a substantially planar central portion and substantially triangular shaped end portions extending substantially perpendicularly to said central portion and pivotally connected to said legs of said U-shaped member;
at least one of said support rods is of a different length than another of said support rods; and
said racks are circular in form;
at least one of said seating holes is positioned with respect to one of said sides of the grill body so that the grill supported on the upper end of the support rod extending from said at least one seating hole extends outwardly over and beyond said one of said sides.

3. A barbecue grill as claimed in claim 2 wherein:
said support rods are tubular members;
said connector is a rod-shaped member protruding from said upper rack and rotatably interfitting in the upper end of a respective support rod; and further comprising
a dish-shaped drawer member slidably supported on the lower surface of said bottom under said ash dispensing holes to receive ash passing through said dispensing holes.

* * * * *